Figure 1:
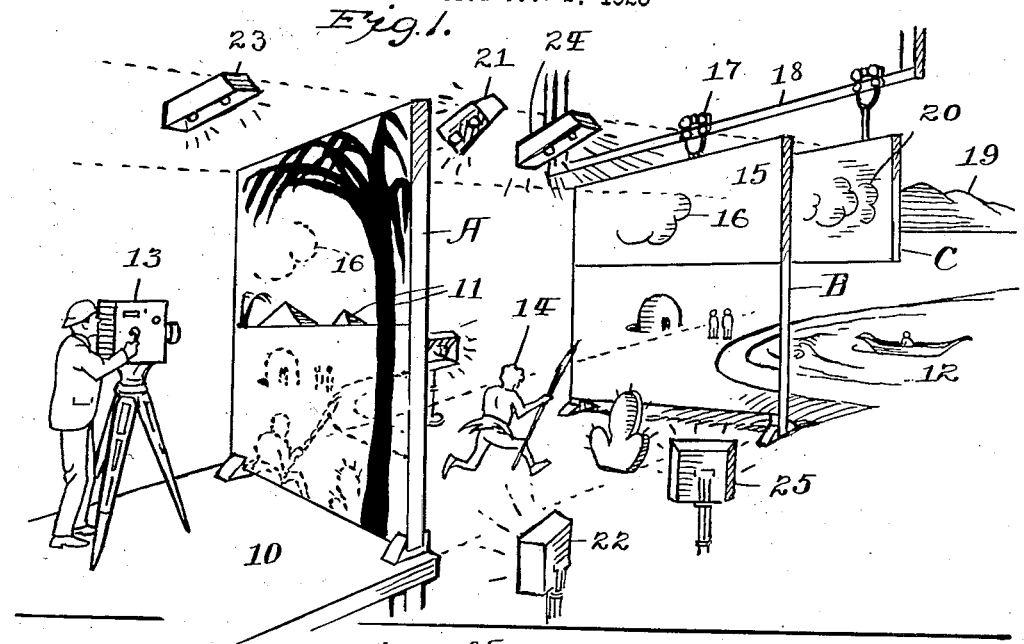

May 15, 1928. 1,669,407

P. ARTIGUE

METHOD AND APPARATUS FOR PRODUCING COMPOSITE MOTION PICTURES

Filed Oct. 2, 1923

Inventor:
Pierre Artigue,
by: Bradbury & Caswell
Attorneys.

Patented May 15, 1928.

1,669,407

UNITED STATES PATENT OFFICE.

PIERRE ARTIGUE, OF LOS ANGELES, CALIFORNIA.

METHOD AND APPARATUS FOR PRODUCING COMPOSITE MOTION PICTURES.

Application filed October 2, 1923. Serial No. 666,112.

This invention relates to the method and apparatus for producing composite motion pictures by positioning within the focal range of the lens of a motion picture camera, a screen or a plurality of screens upon which a portion or portions of the whole scene or picture to be photographed are produced and assembled as regards composition, position, height, size, distance and perspective so that when properly illuminated or colored or both, will harmonize and blend into a composite picture which can not be told in the finished projected picture from a photograph of an original real scene.

A further object of my invention is to combine with a plurality of transparent screens upon which is painted complementary scenery, means preferably artificial lights, for illuminating either or both faces of any one or all of the transparent screens, thereby permitting the ready production of silhouettes or a composite picture having portions thereof illuminated or brightened to correspond with natural scenery when viewed under ordinary sunlight.

A further object of my invention is, to provide a plurality of transparent screens and to space the same a sufficient distance apart so that action by actors or animated objects may take place between the screens, the various screens having painted thereon scenery that is complementary to the natural background scenery and likewise, complementary to the scenery that is painted on the other screens, and further, to space the screens a sufficient distance apart for the accommodation of artificial lights; which latter may be utilized for illuminating any portion of the scenery that is painted on the screens, and which arrangement permits the making or production of silhouette effects on any one or all of the associated screens, and which effects are highly desirable in the making of certain pictures.

By this method or composition, a real stationary scene and an animated scene can be combined with a single or composite artificial scene or a composite artificial scene can be combined with an animated scene effectively with great saving of time and expense. More particularly my improvement relates to the use of a plurality of scenes, each displaying a portion of a whole scene in combination with an animated figure, image or scene and to the blending and harmonizing by illumination and coloring of the portions of the whole scene, thus producing in effect a composition which in minor detail can not be told in the finished projected picture from a photograph of an original scene.

This improvement is upon the disclosure appearing in Letters Patent granted to me on April 16, 1918, bearing Number 1,263,355.

Figure 2:
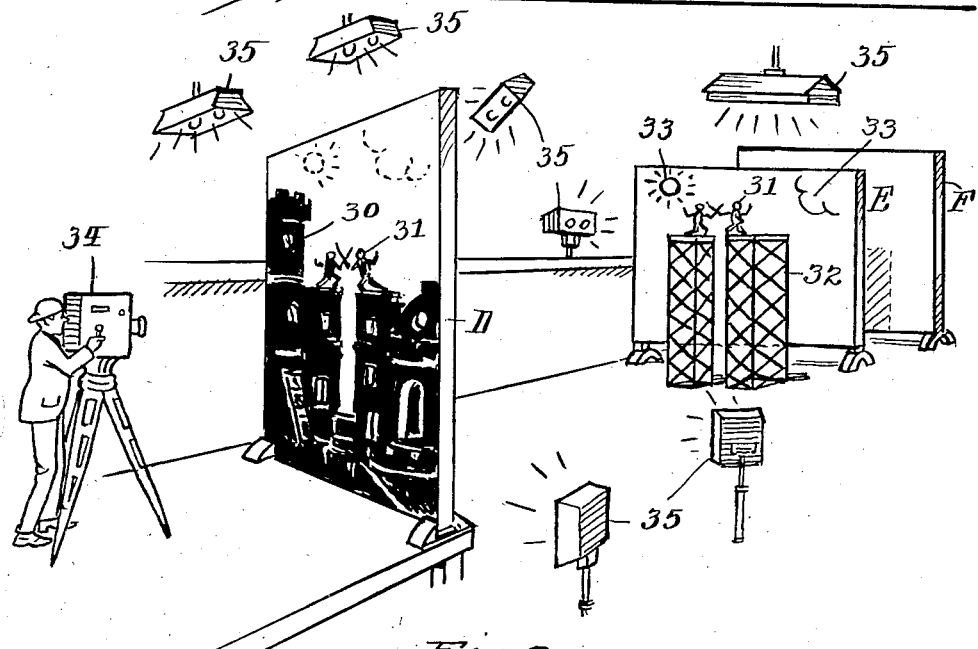

In the accompanying drawing forming part of this specification, Figure 1 is a perspective view illustrating the construction and use of my invention, and Fig. 2 is another perspective view illustrating an alternative construction of my improvement.

The optical principle involved in this invention depends upon the size of the image formed by a lens which is governed by the distance of the object from the lens. By using scenes or details of scenes in proper size proportionate as to distance from the lens, a composite picture may be produced. These scenes and details of scenes I have found in practice can when properly illuminated, colored and blended be produced effectively on a series or plurality of screens either by painting images or portions of images on transparent glass or on opaque cut-outs and can be combined with animated images or natural scenes without animation.

In the drawing, A indicates a main screen which is shown supported upon a platform 10. This screen is made out of glass or other suitable material, upon which is painted with any suitable medium or otherwise produced a foreground scene 11, which is made to coincide or join a natural scene 12 back of the screen and within focal range of the lens of the motion picture camera 13, placed in front of the screen. The broken lines on the screen A indicate the composite image produced back of the screen. The screen being transparent or sufficiently transparent except where covered by scene 11, enables a photograph to be made of the composite scene produced by the two scenes blended, joined and harmonized together. The scene back of the screen may be animated or without animation or both, the illustration being adapted for a combination of both and showing a figure 14, running towards the lake in the back ground.

Additional screens B and C may be provided between the foreground and background scenes bearing detail of proportionate size which may be introduced into the main scene to correspond in size and blend into the composite main scenes. The screen B, which is made out of glass and transparent has its upper portion 15, painted or otherwise made opaque and bearing the image of a cloud 16, which joins into the main scene. Should however it be desired to use animated cloud effect the screen B may be removed and a movable screen C employed. This screen C is movable by the use of carriers 17 mounted upon the rail 18 and while its surface is made opaque the image of a cloud 20 thereon may be used to harmonize with the main scene without obscuring the background 12. By removing both screens B and C, additional natural background 19 may be joined into the composite picture at any time. By placing the cloud effect 16 on a supplemental screen distanced back of the main screen and by lighting the same, a more natural effect is produced in the composite scene than if the cloud effect were placed on the screen nearer the camera.

The natural scene 12 or background is adapted to act as a ground work upon which the animated object 14 may perform and appear in the picture as performing in harmony with the scenes depicted upon the screens. While the movable screen C is shown, the clouds depicted thereon are not illustrated upon the main screen.

The scene appearing upon the screen A may be painted upon or produced by cut outs and used with back lights such as 21 and 22 for silhouettes. The face of the screen may be illuminated by lights 23, to properly blend the scene into the composite picture taken by the camera. Lights 24 and 25 are also provided for the supplementary screens B and C to also more effectively blend the scenes into the composite picture.

The details forming the composite picture including animated subjects before or between the screens are all arranged within the focal range of the camera and the improved structure is adapted for a wide range of usefulness. Should it not be necessary to use all of the screens for producing and harmonizing all of the details, part of the screens may be removed or any number of screens employed.

All of the screens are made out of transparent glass but they may be made out of any other suitable material desired. They may be opaque when desired, or translucent and portions thereof cut away to form openings through which details of the composite scene in the background are visible. They may also have reflecting surfaces to give indirect effects and the lights may be directed upon any portions of the surfaces desired to produce the desired effects.

In Fig. 2 the main screens D and supplemental screens E and F are provided. The screen D has painted or produced thereon the foreground scene 30 and being transparent except as to said scene exposes the animated objects 31 in front of screen E mounted upon the skeleton staging 32. The screen E has the scene details 33 produced thereon and the screen F is shown painted black or opaque to give effective scene effects before the camera 34. Lights 35 are provided for the various scenic effects upon the details. The screens being portable or removable enable wide range of application and combinations.

By the use of a series or plurality of screens, various component details of a picture may be assembled to produce a large range of scenes either alone or in combination with an animated scene or a real scene without animation. Pictures may also be effectively made by the double exposure method, the screens easily permitting that use. Either the foreground or the background can be placed on the main screen as may be most conveniently assembled into the composite scene. The natural scene may also be used as a foreground or as a background.

My invention contemplates the spacing of the painted screens a sufficient distance apart, so that action by actors or animated objects may take place between the transparent screens, portions of which are painted, and by the use of spotlights positioned above the screens, in front, to the rear or to the sides thereof; any particular portion or portions of the matter painted on the screens may be illuminated from front or rear, and as a result, unusual silhouette effects may be attained, or the painted portions of the screen may be brought out in detail to combine with the detail on the other screens and with the natural scenery on the background.

The camera shown in the drawings is illustrated close up to the main screen. In practice, however, it should be placed a much greater distance from the screen in order that the details on the screens may be properly proportioned.

Having described my invention, what I claim as new and desire to secure by Letters Patent is:

1. Apparatus for aiding in the production of a composite motion picture of a main scene, comprising, in combination, a motion picture camera, a plurality of transparent screens assembled one before the other in the foreground within the focal range of the lens of said camera, said transparent screens being spaced a sufficient distance apart to permit action by animated objects to take place between said screens and to permit either face of said screens to be illuminated from above or from either side, each screen bearing an introduced back ground detail of the main scene being photographed by the camera, all of said introduced detail of said main scene being proportionate in size to correspond with the distance from said lens and being joined blended and harmonized into said main scene and controllable means for illuminating either face or any portion of either face of said screens from above or from either side.

2. Apparatus for aiding in the production of a composite motion picture of a main scene, comprising, in combination, a natural scene, a camera having a lens with which said natural scene is in focal range, a plurality of transparent foreground screens assembled one before the other also within focal range of said lens, said transparent screens being spaced a sufficient distance apart to permit action by animated objects to take place between said screens and to permit either face of said screens to be illuminated from above or from either side, each screen bearing an introduced background detail into the main scene all of said introduced detail being proportionate in size to correspond with its distance from said lens and being joined with the natural scene to produce a composite main scene and controllable means for illuminating either face or any portion of either face of said screens from above or from either side.

3. Apparatus for aiding in the production of a composite picture of a main scene, comprising, in combination, a natural scene, a camera having a lens with which said natural scene is in focal range, a plurality of transparent screens assembled one before the other also within focal range of said lens, said transparent screens being spaced a sufficient distance apart to permit action by animated objects to take place between said screens and to permit either face of said screens to be illuminated from above or from either side, each screen bearing an introduced painted background detail into the main scene all of said introduced detail being proportionate in size to correspond with its distance from said lens and being joined with and blended into the natural scene to produce a composite main scene and controllable means for illuminating either face or any portion of either face of said screens from above or from either side.

4. Apparatus for aiding in the production of a composite picture of a main scene, comprising, in combination, a natural scene, a camera having a lens with which said natural scene is in focal range, a plurality of transparent screens assembled one before the other also within focal range of said lens, said transparent screens being spaced a sufficient distance apart to permit action by animated objects to take place between said screens and to permit either face of said screens to be illuminated from above or from either side, each screen bearing an introduced painted background detail into the main scene and all of said introduced detail being proportionate in size to correspond with its distance from said lens and being joined with the natural scene to produce a composite main scene, and controllable means for projecting light from front or rear upon either face of the detail borne by said screens.

5. Apparatus for aiding in the production of a composite picture of a main scene, comprising, in combination, a natural background scene, a camera having a lens with which said natural scene is in focal range, a main transparent screen within focal range of said lens, introducing foreground detail into the main scene, a supplementary movable transparent screen back of said main screen introducing a moving background detail into the main scene. the two screens being spaced a sufficient distance apart to permit action by animated objects to take place between the screens and to permit the illumination of either face of said screens from either side thereof.

6. Apparatus for aiding in the production of a composite picture of a main scene, comprising, in combination, a natural background scene, a camera having a lens with which said natural scene is in focal range, a transparent screen within focal range of said lens introducing foreground detail into the main scene, a supplementary screen spaced apart from the first mentioned screen so as to permit action by animated objects to take place between the screens, and means for projecting light onto said detail for the purpose of blending the detail into the main scene.

In witness whereof I have signed my name to this specification.

PIERRE ARTIGUE.